United States Patent
Chen et al.

(10) Patent No.: US 7,164,270 B1
(45) Date of Patent: Jan. 16, 2007

(54) DYNAMIC MAGNETIC LOCATOR AND METHOD FOR THE SAME

(75) Inventors: Po-Shen Chen, Hsinchu (TW); Wen-Nan Huang, Hsinchu (TW); Mu-Ping Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 11/303,931

(22) Filed: Dec. 19, 2005

(30) Foreign Application Priority Data

Oct. 7, 2005 (TW) .............................. 94135139 A

(51) Int. Cl.
*G01V 3/10* (2006.01)
(52) U.S. Cl. ........................................ 324/326; 324/67
(58) Field of Classification Search ................ 324/326, 324/67
See application file for complete search history.

(56) References Cited

U.S. PATENT DOCUMENTS 6,529,006 B1 * 3/2003 Hayes ......................... 324/326
6,815,953 B1 * 11/2004 Bigelow ..................... 324/329

* cited by examiner

*Primary Examiner*—Reena Aurora
(74) *Attorney, Agent, or Firm*—Birch, Stewart, Kolasch & Birch, LLP.

(57) ABSTRACT

A dynamic magnetic locator includes a linking mechanism linked with a first sensor to horizontal move or rotate the first sensor; a second sensor horizontally arranged beside the first sensor; a third sensor vertically arranged atop the second sensor; and a control module connected to the sensors and receiving magnetic signals of the underground metal pipe. The control module controls the linking mechanism to horizontal move or to rotate the first sensor to obtain a plurality of magnetic signals. The control module processes the magnetic signals to obtain a position and a depth of an underground metal pipe.

5 Claims, 6 Drawing Sheets

DYNAMIC MAGNETIC LOCATOR AND METHOD FOR THE SAME

BACKGROUND OF THE INVENTION

1. Field of the Invention

The present invention relates to a dynamic magnetic locator and method for the same, more particularly to a dynamic magnetic locator and method for the same, which are used for three-dimensional positioning, cross-line positioning and depth calculation of underground metal pipe.

2. Description of Prior Art

The underground pipe is an obstacle for underground construction because the information management of the underground pipe is difficult and the engineering map for the underground pipe is generally incomplete. Therefore, it frequently happens that the underground pipe is damaged during underground construction.

Moreover, even the engineering map for the underground pipe is used for reference of the underground construction; trial digging is necessary to endure the geometric coordinate of the underground pipe. Therefore, the actual position and buried depth of the underground pipe can be ensured. However, the trial digging is troublesome and may have risk.

The advanced countries generally have territory information system, which provides E model (electronic information) for underground pipe distribution. However, the conventional instruments for detecting underground pipe distribution are very expensive. For example, the conventional electromagnetic pipe locator is about 20,000 USD and the ground penetration radar (GPR) is about 600,000 USD. Moreover, it is difficult to perform these instruments to obtain three-dimensional positioning, cross-line positioning and depth calculation.

It is desirable to provide a dynamic magnetic locator and method for the same, which has high accuracy, compactness and low cost.

SUMMARY OF THE INVENTION

The present invention is intended to provide a dynamic magnetic locator and method for the same, which are used for three-dimensional positioning, cross-line positioning and depth calculation of underground metal pipe. The dynamic magnetic locator and method for the same have the advantages of high accuracy, compactness and low cost.

Accordingly, the present invention provides a dynamic magnetic locator includes a linking mechanism linked with a first sensor to horizontal move or rotate the first sensor; a second sensor horizontally arranged beside the first sensor; a third sensor vertically arranged atop the second sensor; and a control module connected to the sensors and receiving magnetic signals of the underground metal pipe. The control module controls the linking mechanism to horizontal move or to rotate the first sensor to obtain a plurality of magnetic signals. The control module processes the magnetic signals to obtain a position and a depth of an underground metal pipe.

According to one aspect of the present invention, the sensor comprises coil-wound core, and further comprises an analog-to-digital converter connected to the coil of the sensor to convert the magnetic signal detected by the coil into digital signal; and a sampling unit connected to the analog-to-digital converter and the control module and sending the digital signal of the analog-to-digital converter to the control module.

According to another aspect of the present invention, the control module comprises a display showing the position and the depth of the underground metal pipe; a keyboard used to input command to adjust the linking mechanism; a recorder used to record a maximal value of the magnetic signal; and a processor connected to the sensors, the display, the keyboard and the recorder to calculate the position and the depth of the underground metal pipe.

According to still another aspect of the present invention, the processor calculates the position and the depth of the underground metal pipe by following formula:

$$Co(Flx) \infty \frac{f(x_1, x_2)}{d^2}$$

where Co: Magnetic flux at core
Flx: Function set of the flux
f: General flux function
d: Pipe depth
x1: Function set of flux for pipe
x2: Function set of flux for core Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWING

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention is based on the principle that the coil-wound core will induce signal according to Faraday's law and Lenz's law where environment signal or external applied signal is present. The coil-wound core can also induce signal by time varying magnetic field to obtain the information of underground pipe distribution.

Figure 1:
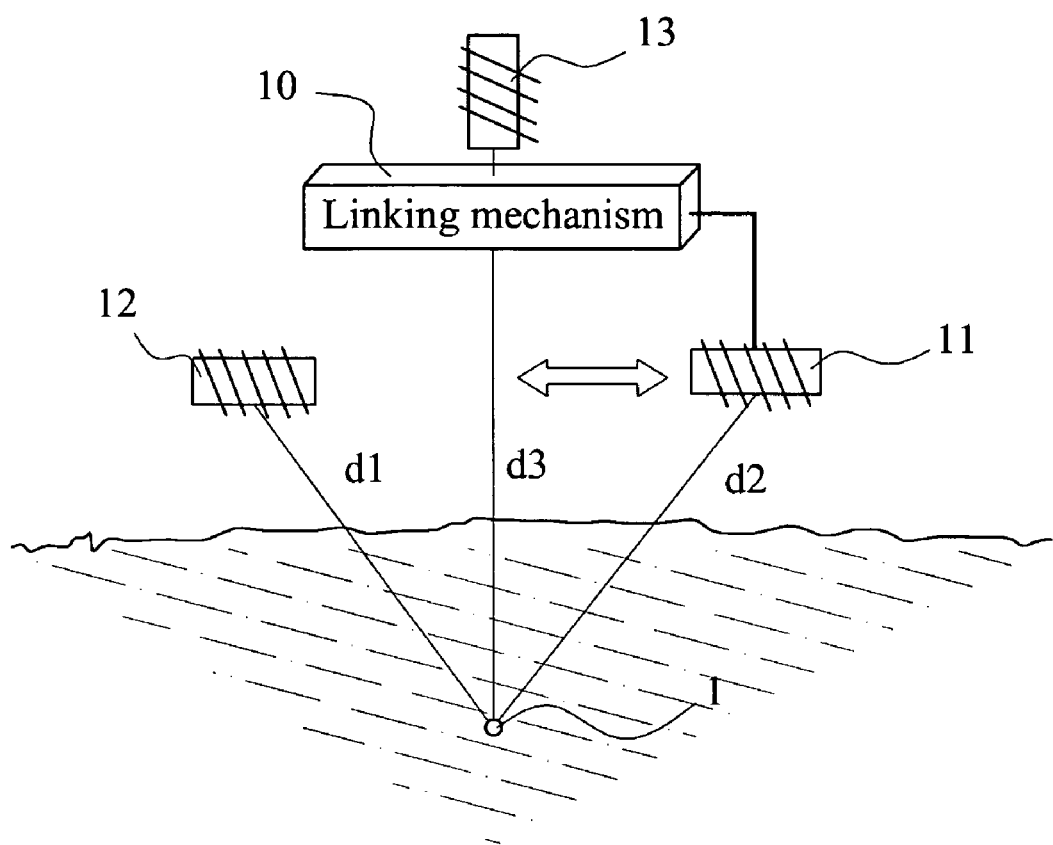
FIG. 1 shows the magnetic locator according to the present invention.
Figure 2:
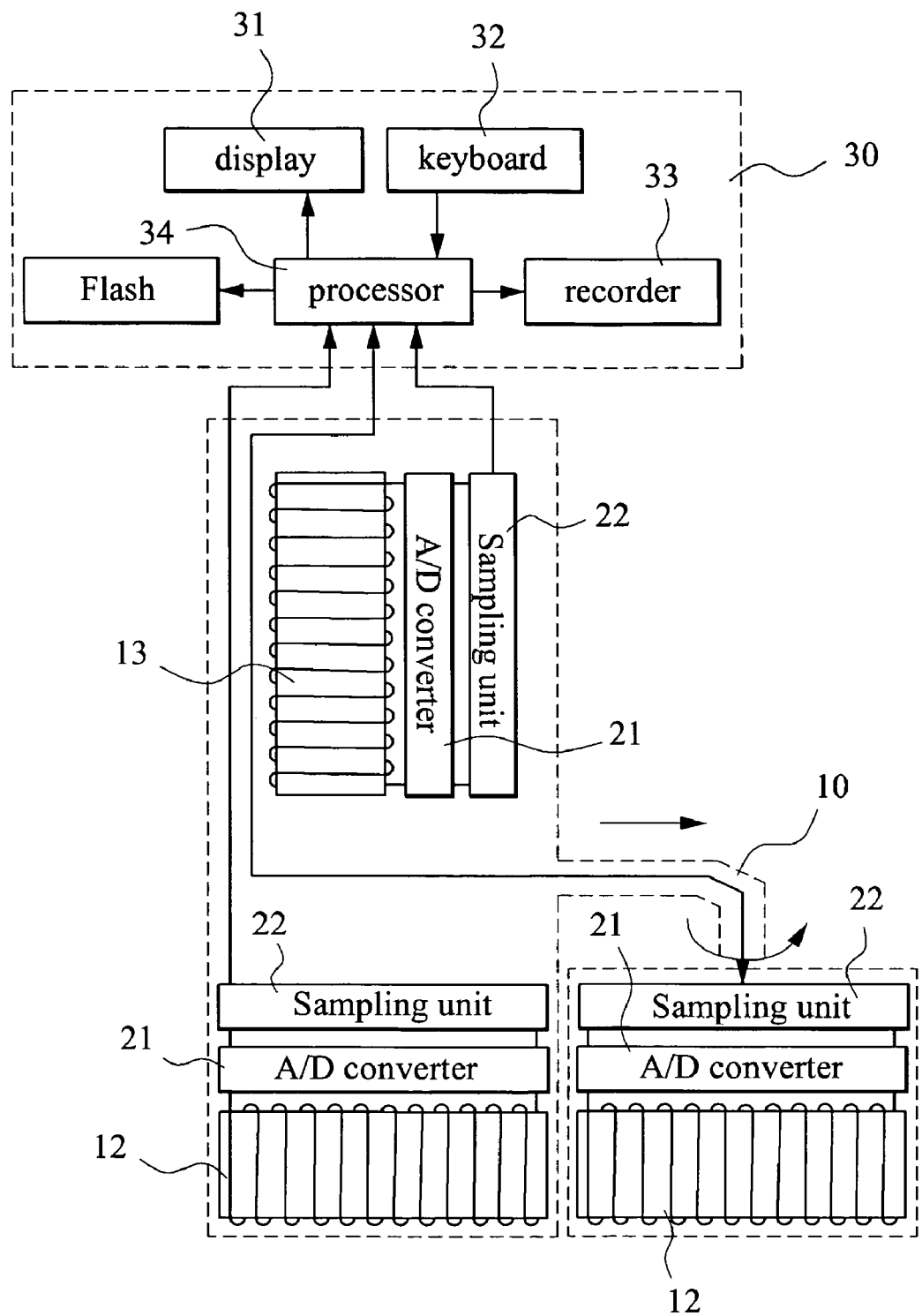
FIG. 2 shows the schematic diagram of the magnetic locator according to the present invention.

FIG. 1 shows the magnetic locator according to the present invention, which comprises a linking mechanism 10 linked with a first sensor 11 and the linking mechanism 10 can horizontally move or rotate the first sensor 11. Moreover, a second sensor 12 is placed beside the first sensor 11 horizontally and a third sensor 13 is arranged atop the second sensor 12. The first sensor 11, the second sensor 12 and the third sensor 13 are each coil-wound core and have respective induced signals when the first sensor 11 is moved or rotated. By solving equations in terms of those induced signal, the position and depth of an underground metal pipe 1 can be determined with following equation (1).

$$Co(Flx) \infty \frac{f(x_1, x_2)}{d^2} \quad (1)$$

where Co: Magnetic flux at core
Flx: Function set of the flux
f: General flux function
d: Pipe depth
x1: Function set of flux for pipe
x2: Function set of flux for core FIG. 2 shows the schematic diagram of the magnetic locator according to the present invention. Each of the sensors further comprises an analog-to-digital converter 21 and a sampling unit 22. The analog-to-digital converter 21 is connected to the coil of the sensor to convert a magnetic signal detected by the coil into digital signal. The sampling unit 22 is connected to the analog-to-digital converter 21 and a control module 30 to send the digital signal of the analog-to-digital converter 21 to the control module 30.

The control module 30 1is connected to the sensors and receives the magnetic signals regarding the underground metal pipe 1. The underground metal pipe 1 controls the first sensor 11 to move or rotate to generate a plurality of magnetic signals for identifying the position and depth of an underground metal pipe 1.

The control module 30 comprises a display 31, a keyboard 32, a recorder 33 and a processor 34. The display 31 shows the information about position and depth of the underground metal pipe. The keyboard 32 provides input for adjusting the position of the linking mechanism 10. The recorder 33 records the maximum for the magnetic signals. The processor 34 is connected to the sensors, the display 31, the keyboard 32 and the recorder 33 to calculate the information about position and depth of the underground metal pipe.

In the present invention, the position of the first sensor can be changed and the formula (1) can be used to calculate the information about position and depth of the underground metal pipe with more equations. As shown in FIG. 1, there are three sensors and the spatial relationship is triangular.

To validate the effectiveness of the present invention for three-dimensional positioning, cross-line positioning and depth calculation, a magnetic circuit simulator Maxwell EM provided by ANSOFT is used. This package software can be used for simulation for magnetic material with 2D and 3D structures.

Figure 3:
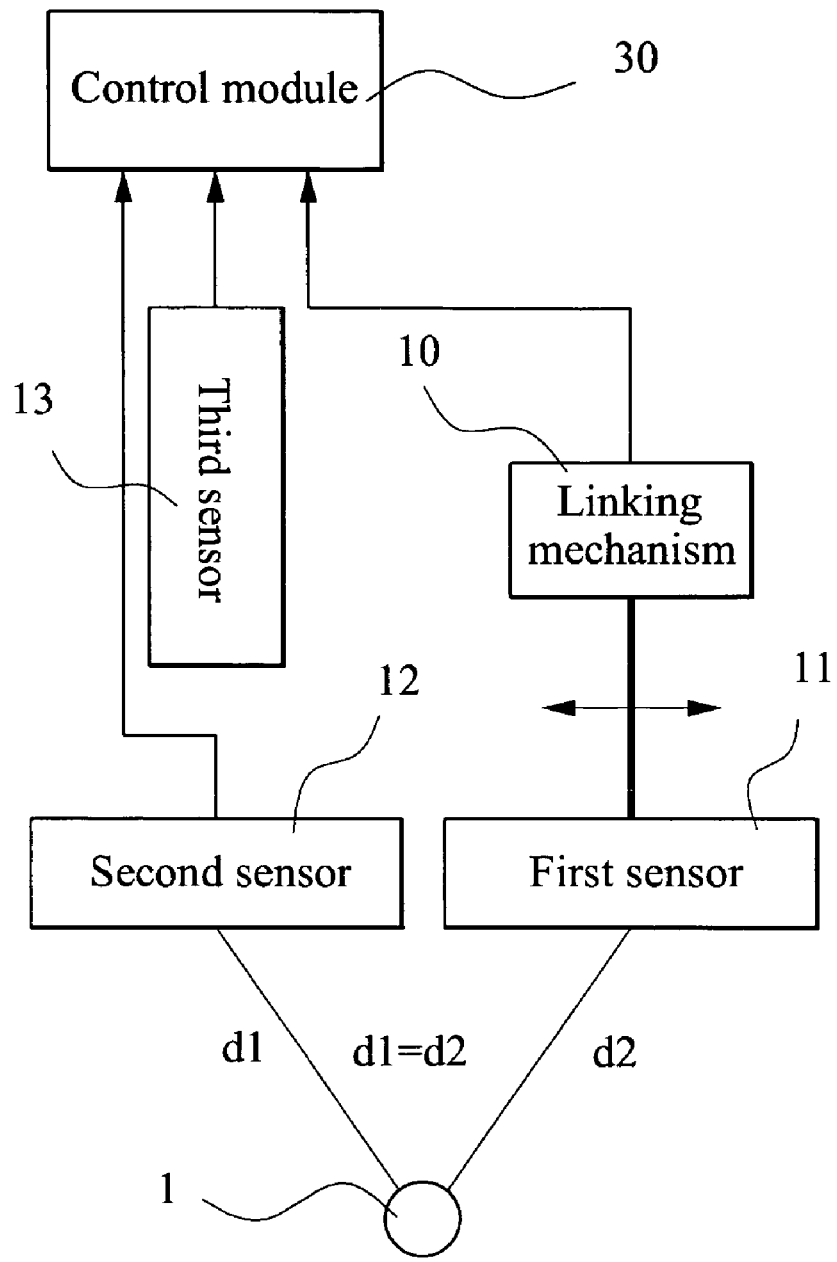
FIG. 3 shows the 2D pipe validation for the present invention.

FIG. 3 shows the 2D pipe validation for the present invention. When the magnetic signals of the first sensor 11 and the second sensor 12 are the same, the magnetic locator of the present invention is placed atop the underground metal pipe 1.

Figure 4:
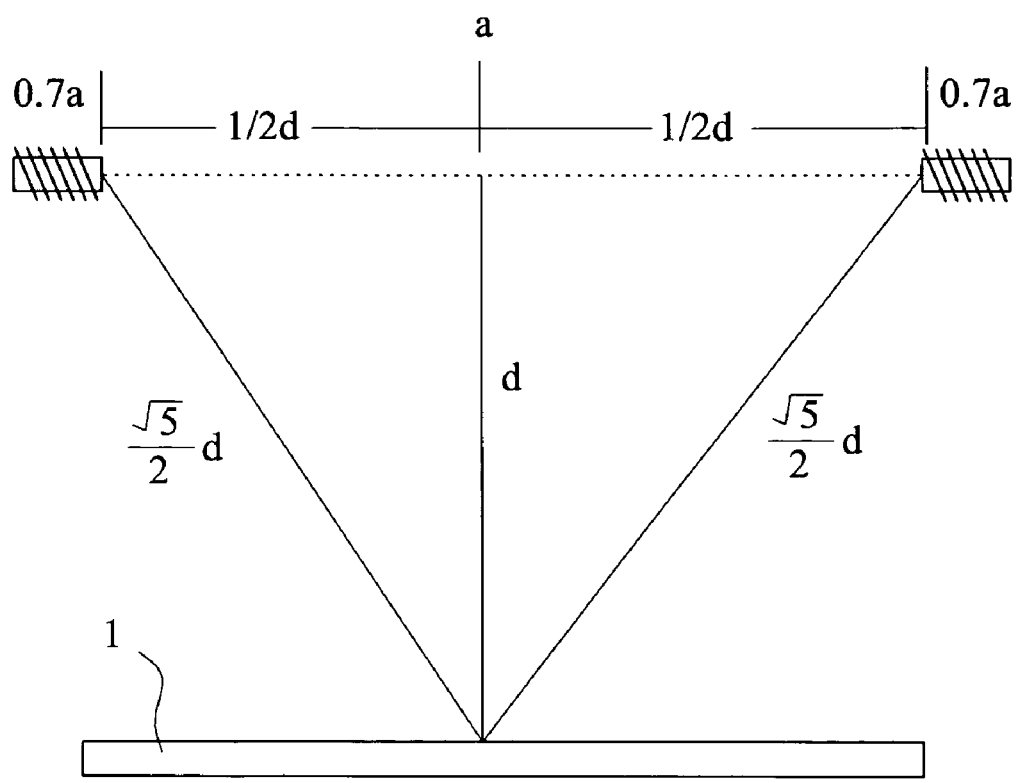
FIG. 4 shows the calculation of the present invention using the formula (1).

The depth of the underground metal pipe 1 can be calculated using the formula (1). FIG. 4 shows the calculation of the present invention using the formula (1). Provided that the magnetic signal detected by the third sensor 13 is zero and the magnetic signal detected by the second sensor 12 is maximum, the first sensor 11 is shifted horizontally and following formulas (2) and (3) are calculated based on the formula (1).

$$Co(flx) \infty \frac{f(x_1, x_2)}{d^2} = a \quad (2)$$

$$Co(flx) \infty \frac{f(x_1, x_2) \cdot \text{Angle}(Tri)}{(\sqrt{5}\, d/2)^2} \cong 0.7a \quad (3)$$

where a: Maximum signal of the coil measured by the first sensor;
Angle: Specific sinusoid function such as Sin or Cos function;
Tri: Angle value.

Figure 5:
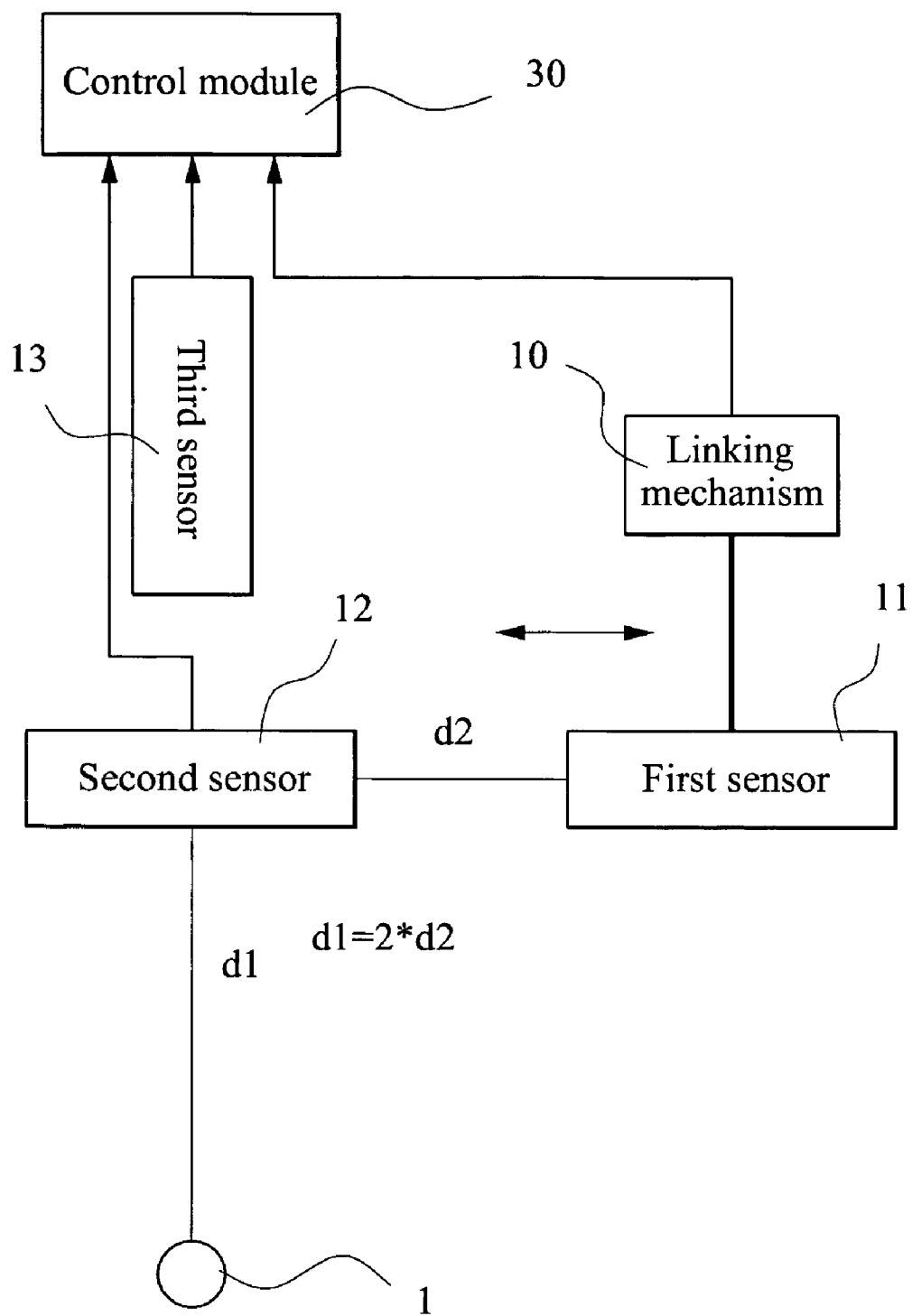
FIG. 5 shows the schematic diagram of the present invention for 3D pipe validation.

When the magnetic signal measured by the first sensor 11 is 70% of the maximal magnetic signal measured by the second sensor 12, the depth of the underground metal pipe 1 is equal to twice of the distance of the first sensor 11. FIG. 5 shows the schematic diagram of the present invention for 3D pipe validation.

Figure 6:
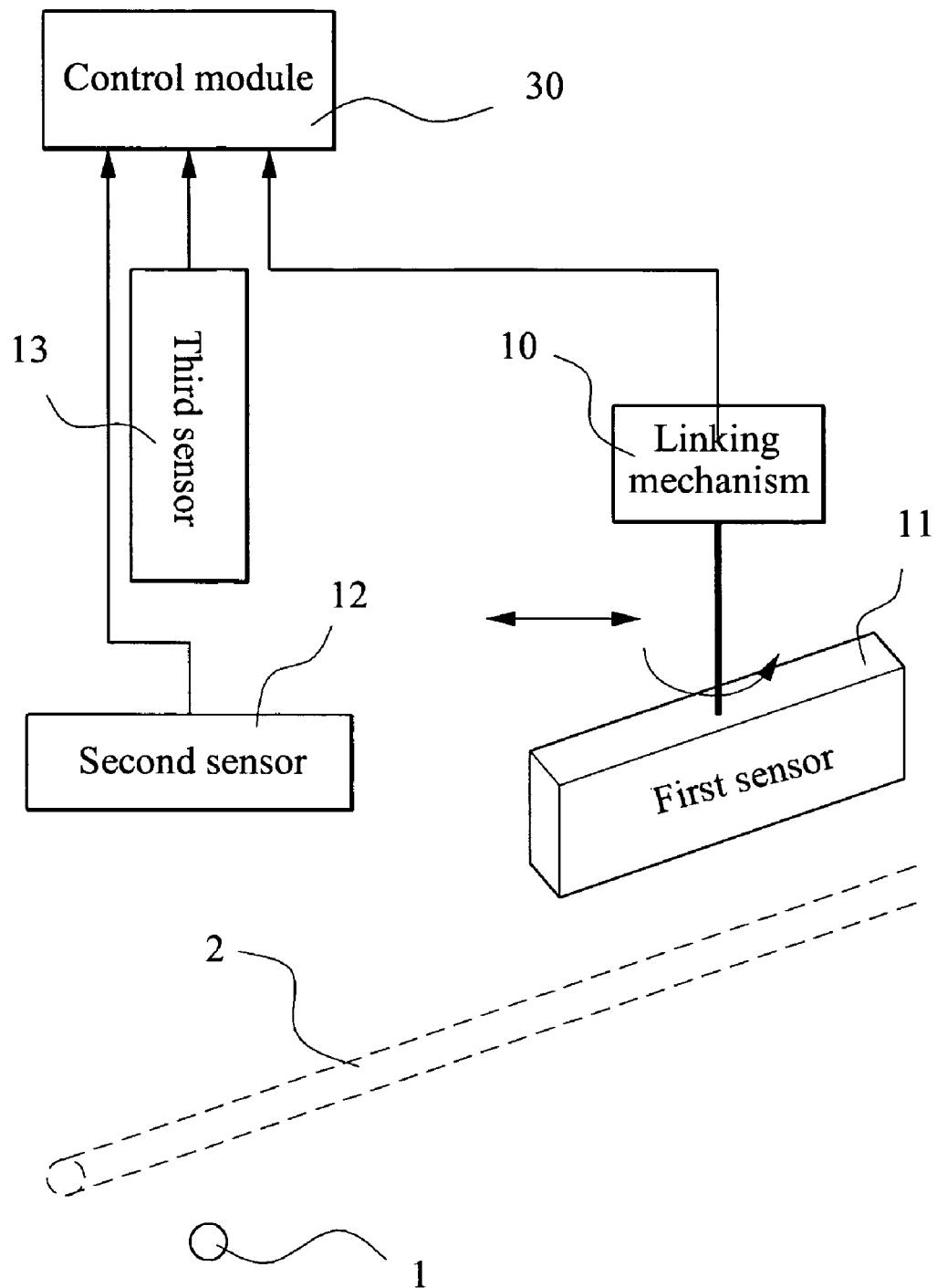
FIG. 6 shows that the present invention is used for crossing pipe test.

With reference to FIG. 6, the present invention is used for crossing pipe test. Provided the magnetic signal detected by the third sensor 13 is not zero, there is another underground metal pipe 2 nearby. The first sensor 11 can be moved horizontally and rotated to detect a maximal signal for the underground metal pipe 2, which will indicated the position of the underground metal pipe 2.

The magnetic locator of the present invention uses coil-wound core to horizontally move or rotate to change measurement position according to control command. The maximal magnetic signal is obtained and recorded for three-dimensional positioning, cross-line positioning and depth calculation.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A dynamic magnetic locator used for three-dimensional positioning, cross-line positioning and depth calculation of an underground metal pipe, the magnetic locator comprising:
   a linking mechanism linked with a first sensor to horizontally move or rotate the first sensor;
   a second sensor horizontally arranged beside the first sensor;
   a third sensor vertically arranged on top of the second sensor; and
   a control module connected to the sensors and receiving magnetic signals of the underground metal pipe, which controls the linking mechanism to move or rotate the first sensor to obtain a plurality of magnetic signals, and processes the magnetic signals to obtain a position and depth of the underground metal pipe,
   wherein the control module comprises:
   a display showing the position and depth of the underground metal pipe;
   a keyboard used to input commands to adjust the means for horizontally moving or rotating the first sensor;

a recorder used to record a maximal value of the magnetic signal; and a processor connected to the sensors, the display, the keyboard and the recorder, to calculate the position and depth of the underground metal pipe the first sensor, the second sensor and the third sensor comprises a coil wound core, wherein the processor calculates the position and the depth of the underground metal pipe by following formula:

$$Co(Flx) \infty \frac{f(x_1, x_2)}{d^2}$$

wherein:
Co: Magnetic flux at core;
Flx: Function set of the flux;
f: General flux function;
d: Pipe depth;
x1: Function set of flux for pipe; and
x2: Function set of flux for core.

2. The dynamic magnetic locator of claim 1, wherein the sensor further comprises
an analog-to-digital converter connected to the coil of the sensor to convert the magnetic signal detected by the coil into a digital signal;
a sampling unit connected to the analog-to-digital converter and the control module, which sends the digital signal from the analog-to-digital converter to the control module.

3. A method for dynamically detecting three-dimensional positioning, cross-line positioning and depth calculation of an underground metal pipe with a magnetic locator, the method comprising the following steps:
providing a horizontally movable and rotatable first sensor;
providing a second sensor horizontal to the first sensor;
providing a third sensor vertical to the second sensor;
positioning the underground metal pipe when detected magnetic signals of the first sensor and the second sensor are the same; and
horizontally moving the first sensor to detect and calculate the depth of the underground metal pipe the first sensor, the second sensor and the third sensor comprises a coil wound core;
wherein, when horizontally moving the first sensor to detect and calculate the depth of the underground metal pipe, the depth of the underground metal pipe is calculated according to the following formula:

$$Co(Flx) \infty \frac{f(x_1, x_2)}{d^2}$$

Where:
Co: Magnetic flux at core;
Flx: Function set of the flux;
f. General flux function;
d: Pipe depth;
x1: Function set of flux For pipe; and
x2: Function set of flux for core.

4. The method of claim 3, wherein, in the step of horizontally moving the first sensor, when the magnetic signal measured by the first sensor is 70% of the maximal magnetic signal measured by the second sensor, the depth of the underground metal pipe is equal to twice the distance of the first sensor.

5. The method as in of claim 3, wherein, in the step of providing a third sensor vertical to the second sensor, when the magnetic signal detected by the third sensor is zero, it means there is another underground metal pipe, then the first sensor if horizontally moved or rotated to and the position of another underground metal pipe can be identified by a maximum of a magnetic signal of the first sensor.

* * * * *